United States Patent
Creta et al.

(10) Patent No.: US 7,162,546 B2
(45) Date of Patent: Jan. 9, 2007

(54) REORDERING UNRELATED TRANSACTIONS FROM AN ORDERED INTERFACE

(75) Inventors: Kenneth C. Creta, Gig Harbor, WA (US); Robert T. George, Austin, TX (US); Bradford B. Congdon, Olympia, WA (US); Tony S. Rand, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 730 days.

(21) Appl. No.: 10/034,641

(22) Filed: Dec. 27, 2001

(65) Prior Publication Data

US 2003/0126336 A1 Jul. 3, 2003

(51) Int. Cl.
*G06F 3/00* (2006.01)
(52) U.S. Cl. ............... 710/5; 710/6; 710/7; 710/33; 710/36
(58) Field of Classification Search ............. 710/5–7, 710/16, 53, 54, 55, 56, 57, 58
See application file for complete search history.

(56) References Cited

U.S. PATENT DOCUMENTS

| 5,805,839 | A | * | 9/1998 | Singhal | 710/112 |
| 5,930,485 | A | * | 7/1999 | Kelly | 710/112 |
| 6,108,741 | A | * | 8/2000 | MacLaren et al. | 710/314 |
| 6,418,503 | B1 | * | 7/2002 | Moertl et al. | 710/310 |
| 6,754,751 | B1 | * | 6/2004 | Willke | 710/112 |

OTHER PUBLICATIONS

Solari and Willse; PCI and PCI-X Hardware and Software Architecture and Design; 2001; Annabooks; Fifth Edition; pp. 512-516.*

* cited by examiner

*Primary Examiner*—Kim Huynh
*Assistant Examiner*—Alan S. Chen
(74) *Attorney, Agent, or Firm*—Philip A. Pedigo

(57) ABSTRACT

A computer chipset having an identifier module and a router. The identifier module is configured to add sequence identifiers to each transaction in independent ordered sequences of transactions. The sequence identifiers identify which ordered sequence the transactions belong to. The identifier module combines the ordered sequences of transactions into a combined ordered sequence of transactions. The combined ordered sequence of transactions are sent over an ordered interface. A router then separates the combined ordered sequence of transactions into ordered queues based on the sequence identifiers associated with the transactions. The transactions in the ordered queues are executed in an order that reduces the time required to complete the transactions.

15 Claims, 2 Drawing Sheets

REORDERING UNRELATED TRANSACTIONS FROM AN ORDERED INTERFACE

TECHNICAL FIELD

This invention relates to reordering unrelated transactions from an ordered interface.

BACKGROUND

Computer input/output (I/O) interfaces connected to a data bus typically have to follow specific transaction ordering rules. For example, a computer I/O hub that is connected to a Peripheral Component Interface (PCI) bus must preserve the order of write transactions from I/O controllers sent through the PCI bus. Examples of I/O devices are disk drives, video cards, audio cards, scanners, digital cameras, network adapters, and docking ports for handheld devices. The I/O hub typically implements an I/O interface using modified first-in-first-out (FIFO) queues to store transactions from the I/O devices in an order that obey PCI ordering rules. Such FIFO queues are low-cost, easy to implement, and produce few errors.

When an I/O controller initiates an ordered sequence of transactions, the I/O hub stores the transactions in the modified FIFO queues and typically executes them in the order received. An example of an ordered sequence of transactions is a sequence of write transactions initiated by a hard drive controller that writes data to a main memory. The write transactions that come at a later time cannot be executed until the earlier transactions are completed. If one write transaction is stalled, all of the remaining write transactions will be stalled.

DETAILED DESCRIPTION

The invention relates to a computer chipset having an identifier module configured to add a sequence identifier to each transaction in independent ordered sequences of transactions. The identifier module combines the ordered sequences of transactions into a combined ordered sequence of transactions. The computer chipset further includes a router that separates the combined ordered sequence of transactions into ordered queues based on the sequence identifiers associated with the transactions.

Figure 1:
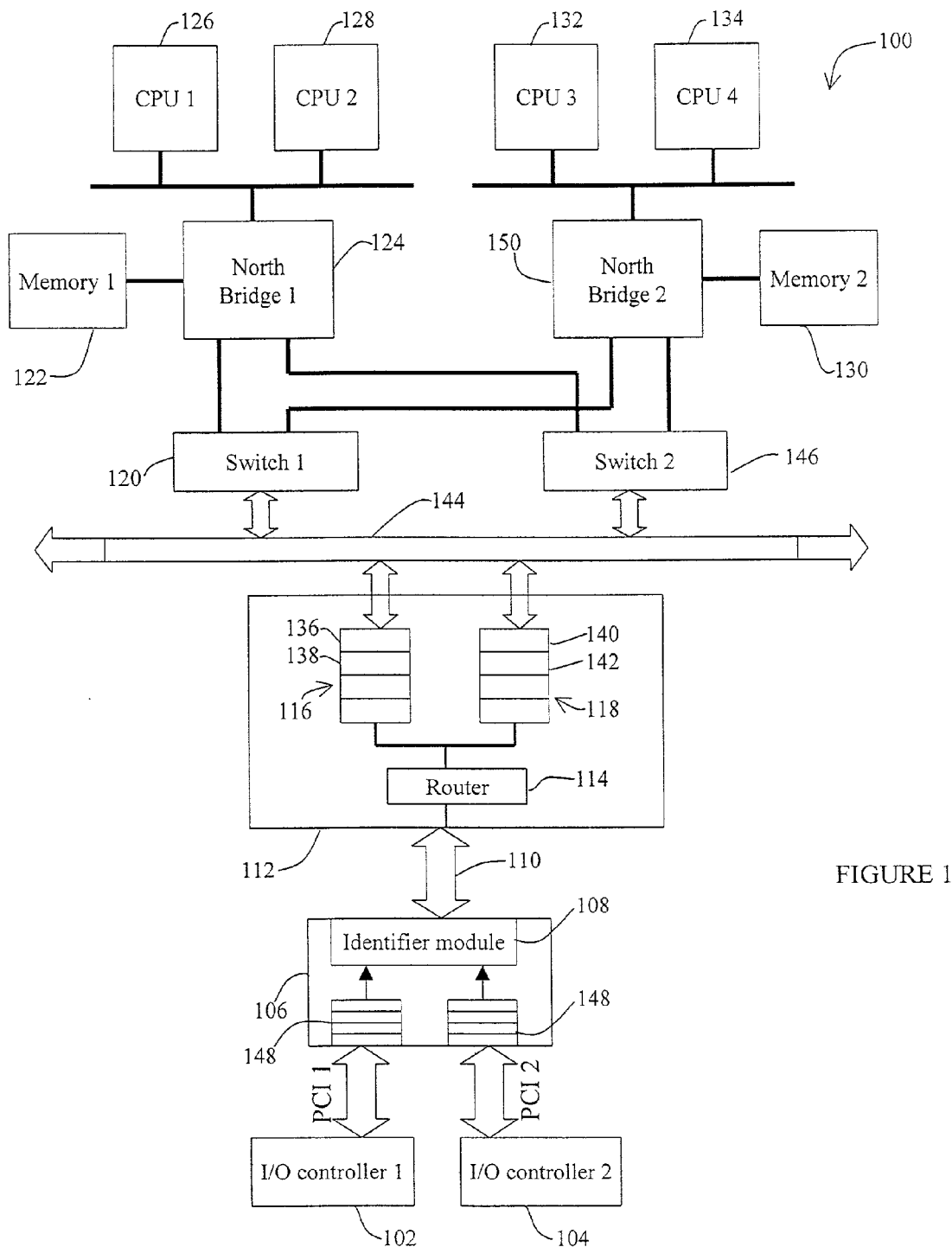
FIG. 1 is a schematic diagram of a computer system.

Referring to FIG. 1, a multiprocessor computer system 100 includes central processing units 126, 128, 132, 134, and memory devices 122 and 130. An I/O controller 102 sends a first ordered sequence of transactions, and another I/O controller 104 sends a second ordered sequence of transactions. The first and second ordered sequences of transactions are sent over PCI 1 and PCI 2 data buses, respectively, to a PCI bridge 106. PCI bridge 106 includes modified FIFO queues 148 to store the incoming transactions. PCI bridge 106 further includes an identifier module 108 that adds a first sequence identifier to each transaction in the first ordered sequence, and a second sequence identifier to each transaction in the second ordered sequence. PCI bridge 106 then combines the first and second ordered sequences of transactions, along with their respective sequence identifiers, into a combined ordered sequence of transactions, which are sent onto data bus 110.

An advantage of the invention is that by using sequence identifiers, it is possible to combine the first and second ordered sequences of transactions and send the transactions over an ordered interface in a particular order, then later execute the transactions in a different order that reduces the amount of time required to complete the transactions. By using a simple identifier module and modified FIFO queues, an I/O interface (e.g., the PCI bridge) that connects to multiple I/O devices can be constructed with low cost.

The combined ordered sequence of transactions is sent to an I/O hub 112 through data bus 110 that follows PCI ordering rules. I/O hub 112 contains a router 114 that routes the transactions in the combined ordered sequence to two independently ordered queues 116 and 118 based on the sequence identifiers associated with the transactions. Transactions associated with the first and second sequence identifier are routed to ordered queues 116 and 118, respectively. The ordered queues are implemented in a modified FIFO structure that obeys PCI ordering rules. The transactions in ordered queue 116 leaves the queue in an order that follows PCI ordering rules. Likewise, the transactions in ordered queue 118 leaves the queue in an order that is the same as the order in which I/O controller 104 initiated the transactions. The transactions leaving the ordered queues are sent to a data bus 144 that has relaxed ordering rules, meaning that transactions on this data bus do not have to be executed in the same order as they arrive to the data bus.

The transactions stored in ordered queues 116 and 118 are executed in an order that tends to reduce the total amount of time required to complete the transactions. As an example, the first and second transactions 136 and 138 waiting to be executed in ordered queue 116 are write transactions that write data to a memory device 122. The first and second transactions 140 and 142 waiting to be executed in ordered queue 118 are write transactions that write data to a memory device 130. Suppose transaction 136 is executed, and because memory device 122 is busy, transaction 136 is stalled and cannot be completed. Then transaction 140 in the ordered queue 118 is executed. If the transaction 140 is completed before transaction 136, then transaction 142 is executed next. Since transaction 142 is unrelated to transaction 136, transaction 142 does not have to wait for transaction 136 to be completed. An advantage of the invention is that the waiting time for completing unrelated transactions initiated by I/O controllers 102 and 104 can be reduced.

Many conditions can cause transaction 136 to be stalled. For example, the north bridge 124 might be busy, or the switches 120 and 146 might be busy. It is also possible that transaction 136 itself requires a long time to complete. For example, if transaction 136 is a write transaction that follows the Modified-Exclusive-Shared-Invalid (MESI) protocol, several steps are required to complete the write transaction (e.g., assert a cache line as exclusive, modify the cache line, and flush the cache line). By using ordered queues 116 and 118, transaction 140 can be executed without waiting for transaction 136 to be completed.

Figure 2:
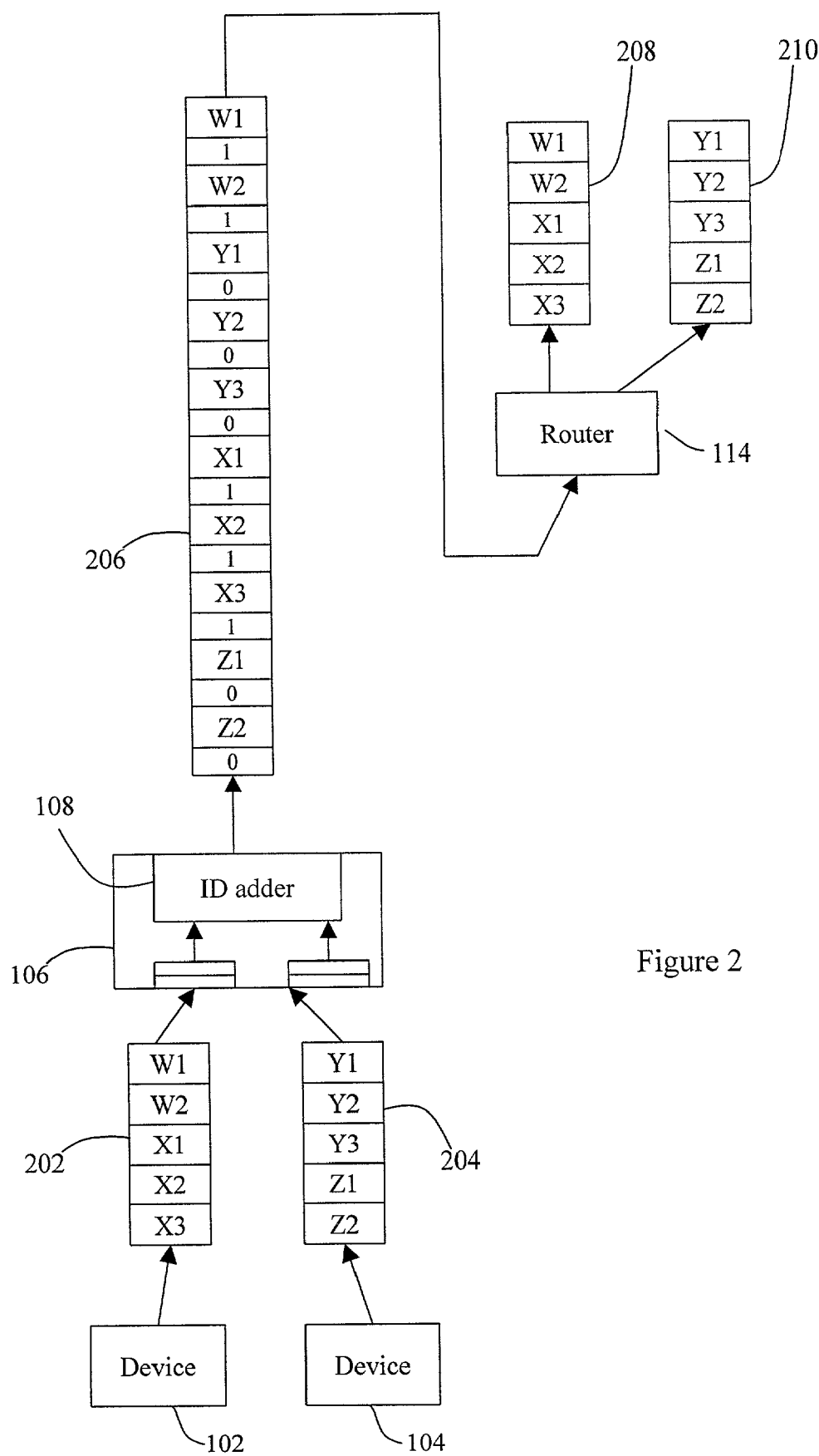
FIG. 2 is a schematic diagram showing sequences of transactions.

FIG. 2 shows an ordered sequence 202 of transactions W1, W2, X1, X2, and X3 initiated by controller 102, and an ordered sequence 204 of transactions Y1, Y2, Y3, Z1, and Z2 initiated by controller 104. As an example, transactions W1 and W2 are write transactions that write data to successive addresses in memory 122. Transactions Y1, Y2, and Y3 are write transactions that write data to successive addresses in memory 130. Transactions W1 and W2 must be executed in sequence, and transactions Y1, Y2, Y3 must be executed in sequence. However, there is no requirement that Y1, Y2, and Y3 must be executed before or after W1 and W2.

After PCI bridge 106 receives the transactions in sequences 202 and 204, identifier module 108 adds sequence identifiers to each of the transactions. In this example, the identifiers are bits "0" and "1". Every transaction in sequence 202 is tagged with an identifier bit "0", and every transaction in sequence 204 is tagged with an identifier bit "1". PCI bridge 106 then combines the transactions in sequences 202 and 204 along with their respective identifier bits into a combined sequence 206 of transactions. The sequences 202 and 204 are combined in a manner such that the ordering of the transactions in the combined sequence 206 follows PCI ordering rules. Note that although sequences 202, 204, and 206 are all shown in the figure, sequence 206 does not appear simultaneously with sequences 202 and 204.

The combined sequence 206 is sent to router 114, which then routes the transactions to ordered queues 116 and 118 based on the sequence identifiers. The transactions in ordered queue 116 form an ordered sequence 208, and the transactions in ordered queue 118 form an ordered sequence 210. The transactions in ordered sequence 210 have an order that is the same as the ordered sequence 202, the transactions in ordered sequence 212 has an order that is the same as the ordered sequence 204.

Without identifier module 108 and router 114, computer system 100 would have to execute the transactions in the order that they arrive at south bridge 106. Thus, transactions Y1 to Z2 cannot be executed until both W1 and W2 are completed. If transactions W1 or W2 were delayed, all transactions following them would also be delayed. By adding sequence identifiers to the transactions and separating the transactions into separate ordered queues, unrelated transactions can be executed in an order that is different from the order in the combined sequence 206. If W1 or W2 were delayed, I/O hub 112 passes transactions in sequence 210 that are stored in ordered queue 118 onto data bus 144. Switches 120 and 146 send the transactions to one of the two north bridges 124 and 150, which then writes data to memory devices 122 or 130 based on the instructions contained in the write transactions. Thus, use of sequence identifiers allows re-ordering of unrelated transactions so that the overall execution time is reduced.

Other embodiments are within the scope of the following claims. For example, the transactions may comprise read transactions instead of (or in addition to) write transactions. The I/O controllers can be controllers of any I/O device that sends data to a memory through the I/O bridge. More than two I/O interfaces can be connected to PCI bridge 106, and more than two ordered queues can be implemented in I/O hub 112. The computer system may have only one processor. The PCI buses may be some other type of data buses that require transactions to follow certain ordering rules. Data bus 110 may follow ordering rules different from the PCI ordering rules. The sequence identifiers can have more than one bit so that it can identify more than two sequences of transactions. The sequence identifiers can be some identifier code other than tag bits. The I/O hub and the north bridge can be a single integrated circuit. The computer system can have more than two memory devices.

What is claimed is:

1. A computer chipset comprising:
an identifier module to add a first sequence identifier to each transaction in a first ordered sequence of transactions and to add a second sequence identifier to each transaction in a second ordered sequence of transactions, and to combine the first and second ordered sequences of transactions into a combined ordered sequence of transactions, wherein the combined ordered sequence includes the sequence identifiers associated with the transactions and further wherein the sequence identifiers indicate independently ordered sequences of transactions; and
a router to separate the combined ordered sequence of transactions into two ordered queues based on the sequence identifiers associated with the transactions.

2. The computer chipset of claim 1, further comprising an output port to send the transactions in the two ordered queues to a data bus in an order that reduces the time required to complete the transactions.

3. The computer chipset of claim 1 in which the first sequence of transactions comprise transactions from a first input/output device, and the second sequence of transactions comprise transactions from a second input/output device.

4. The computer chipset of claim 3 in which the transactions comprise write transactions.

5. The computer chipset of claim 4 in which the combined ordered sequence of transactions follow PCI ordering rules.

6. The computer chipset of claim 3 in which the transactions comprises read transactions.

7. Apparatus comprising
a port to receive first and second ordered sequences of transactions from first and second devices, respectively;
an identifier adding component to add a first sequence identifier to each transaction in the first sequence and to add a second sequence identifier to each transaction in the second sequence, and to combine the first and second ordered sequences of transactions with their respective identifiers into a third ordered sequence of transactions, wherein the third ordered sequence includes the sequence identifiers associated with the transactions and further wherein the sequence identifiers indicate independently ordered sequences of transactions; and
a router to separate the transactions in the third ordered sequence into two ordered queues of transactions based on the sequence identifiers associated with the transactions.

8. The apparatus of claim 7, further comprising an execution component to execute the transactions in the two ordered queues in an order that reduces the time required to complete the transactions.

9. The apparatus of claim 8, further comprising an interface that follows an ordering rule, the third ordered sequence of transactions being transmitted from the identifier adding component to the router through the interface.

10. The apparatus of claim 7 in which the transactions comprise write transactions.

11. The apparatus of claim 10, further comprising a memory, the write transactions writing units of data to the memory in a predetermined order.

12. The apparatus of claim 11, further comprising another memory, the first sequence of transactions writing units of data to the memory in a predetermined order, the second sequence of transactions writing units of data to other memory in a predetermined order.

13. The apparatus of claim 7 in which the transactions comprise read transactions.

14. The apparatus of claim 7 in which the first and second ordered sequences of transactions follow PCI ordering rules.

15. The apparatus of claim 14 in which the third ordered sequence of transactions follow PCI ordering rules.

* * * * *